United States Patent
Kim et al.

(10) Patent No.: US 10,129,343 B2
(45) Date of Patent: Nov. 13, 2018

(54) METHOD FOR SEARCHING FOR DOCKING SERVICE AND PERIPHERAL FUNCTION BY USING DIRECT COMMUNICATION AND APPARATUS FOR SAME

(71) Applicant: LG ELECTRONICS INC., Seoul (KR)

(72) Inventors: Dongcheol Kim, Seoul (KR); Jaeho Lee, Seoul (KR); Byungjoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 15/112,996

(22) PCT Filed: Jan. 20, 2015

(86) PCT No.: PCT/KR2015/000559
§ 371 (c)(1),
(2) Date: Jul. 20, 2016

(87) PCT Pub. No.: WO2015/111893
PCT Pub. Date: Jul. 30, 2015

(65) Prior Publication Data
US 2016/0337457 A1 Nov. 17, 2016

Related U.S. Application Data

(60) Provisional application No. 61/930,412, filed on Jan. 22, 2014.

(51) Int. Cl.
*H04L 29/08* (2006.01)
*H04W 4/20* (2018.01)
(Continued)

(52) U.S. Cl.
CPC ............... *H04L 67/16* (2013.01); *H04W 4/20* (2013.01); *H04W 8/005* (2013.01); *H04W 76/10* (2018.02); *H04W 84/18* (2013.01)

(58) Field of Classification Search
CPC ........ H04L 67/16; H04W 4/20; H04W 76/02; H04W 84/18; H04W 8/005
See application file for complete search history.

(56) References Cited

U.S. PATENT DOCUMENTS

| 2013/0145050 A1 | 6/2013 | Huang et al. |
| 2014/0044114 A1 * | 2/2014 | Lee ..................... H04W 76/023 370/338 |

(Continued)

FOREIGN PATENT DOCUMENTS

| KR | 10-2011-0073239 | 6/2011 |
| KR | 10-2012-0095572 | 8/2012 |

(Continued)

OTHER PUBLICATIONS

United States Patent and Trademark Office U.S. Appl. No. 15/112,407, Office Action dated Nov. 28, 2017, 17 pages.

(Continued)

*Primary Examiner* — Awet Haile
(74) *Attorney, Agent, or Firm* — Lee, Hong, Degerman, Kang & Waimey

(57) ABSTRACT

Disclosed are a method and an apparatus capable of searching for a docking service and a peripheral function incidental to the docking service in a direct communication system. To this end, a method by which a first wireless device searches for a peripheral function provided by a second wireless device can comprise the steps of: transmitting a probe request frame to the second wireless device by the first wireless device; and receiving a probe response frame from the second wireless device as a response to the search request, wherein the probe response frame can include a (Continued)

bitmap for indicating a name of the peripheral function supported by the second wireless device or the peripheral function supported by the second wireless device.

8 Claims, 8 Drawing Sheets

(51) Int. Cl.
    *H04W 8/00*     (2009.01)
    *H04W 76/10*    (2018.01)
    *H04W 84/18*    (2009.01)

(56) References Cited

U.S. PATENT DOCUMENTS

| | | | |
|---|---|---|---|
| 2014/0196125 A1 | 7/2014 | Huang et al. | |
| 2014/0293978 A1* | 10/2014 | Yang | H04W 8/005 |
| | | | 370/338 |
| 2014/0351477 A1 | 11/2014 | Lee et al. | |
| 2014/0351927 A1* | 11/2014 | Huang | G06F 21/44 |
| | | | 726/19 |
| 2016/0338125 A1 | 11/2016 | Kim et al. | |

FOREIGN PATENT DOCUMENTS

| | | |
|---|---|---|
| KR | 10-2012-0103567 | 9/2012 |
| KR | 10-1260913 | 5/2013 |
| WO | 2012060611 | 5/2012 |
| WO | 2013036092 | 3/2013 |
| WO | 2013038359 | 3/2013 |
| WO | 2013073838 | 5/2013 |

OTHER PUBLICATIONS

PCT International Application No. PCT/KR2015/000558, Written Opinion of the International Searching Authority dated Apr. 22, 2015, 24 pages.

PCT International Application No. PCT/KR2015/000559, Written Opinion of the International Searching Authority dated Apr. 24, 2015, 23 pages.

* cited by examiner (a)

"A" associated with "B"

(b)

● Group Owner  ◎ Group Client  —✕— Link termination (a)

"A" associated with "B"

(b)

● Group Owner  ◎ Group Client  ⊜ Not in group (a)

"A" associated with "B"

(b)

● Group Owner  ◎ Group Client  --×-- Link termination

| Service name: UTF-8 string | PF1 | PF2 | PF3 | PF4 | PF5 | PF6 | PF7 | ... | PFn |
|---|---|---|---|---|---|---|---|---|---|
| | 0 | 0 | 1 | 1 | 0 | 0 | 0 | ... | 0 |

METHOD FOR SEARCHING FOR DOCKING SERVICE AND PERIPHERAL FUNCTION BY USING DIRECT COMMUNICATION AND APPARATUS FOR SAME

CROSS-REFERENCE TO RELATED APPLICATIONS

This application is the National Stage filing under 35 U.S.C. 371 of International Application No. PCT/KR2015/000559, filed on Jan. 20, 2015, which claims the benefit of U.S. Provisional Application No. 61/930,412, filed on Jan. 22, 2014, the contents of which are all hereby incorporated by reference herein in their entirety.

TECHNICAL FIELD

The present invention relates to a wireless communication system, and more particularly, to a method for searching for a docking service and a peripheral function incidental to the docking service in a direct communication system.

BACKGROUND ART

Recently, with the development of information communication technology, various wireless communication technologies have been developed. Of the technologies, wireless LAN (WLAN) is the technology that allows home or company or a specific service zone to access Internet wirelessly by using a portable terminal such as a personal digital assistant (PDA), a lap top computer, a portable multimedia player (PMP).

As direct communication technology that may allow devices to be easily connected with each other without a radio access point (AP) basically required in a conventional WLAN system, the introduction of Wi-Fi Direct or Wi-Fi peer-to-peer (P2P) has been discussed. According to Wi-Fi Direct, devices may be connected to each other even without a complicated establishment procedure. Also, Wi-Fi Direct may support a mutual operation for data transmission and reception at a communication speed of a general WLAN system to provide users with various services.

Recently, various Wi-Fi support devices have been used. Of the Wi-Fi support devices, the number of Wi-Fi Direct support devices that enable communication between Wi-Fi devices without AP has been increased. In Wi-Fi Alliance (WFA), technology for the introduction of a platform for supporting various services (for example, Send, Play, Display, Print, etc.) using Wi-Fi Direct link has been discussed. This may be referred to as Wi-Fi Direct Service (WFDS).

The present invention intends to define a new Wi-Fi Direct service capable of remotely controlling another device except four pre-defined services.

DISCLOSURE OF THE INVENTION

Technical Task

The technical task of the present invention is to provide a WFDS docking service, and more particularly, a method for informing a wireless dockee of a peripheral function supported by a wireless docking center during a device discovery procedure.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of discovering a peripheral function provided by a second wireless device, which is discovered by a first wireless device, including: transmitting, by the first wireless device, a probe request frame to the second wireless device; and receiving a probe response frame from the second wireless device in response to a discovery request. In this case, the probe response frame may include a name of the peripheral function supported by the second wireless device or a bitmap indicating the peripheral function supported by the second wireless device.

In a second technical aspect of the present invention, provided herein is a method of providing a peripheral function supported by a first wireless device to a second wireless device, which is provided by the first wireless device, including: receiving, by the first wireless device, a probe request frame from the second wireless device; and transmitting a probe response frame to the second wireless device in response to a discovery request. In this case, the probe response frame may include a name of the peripheral function supported by the first wireless device or a bitmap indicating the peripheral function supported by the first wireless device.

In a third technical aspect of the present invention, provided herein is a first wireless device, including a transceiver and a processor. In this case, the processor may control the transceiver to transmit a probe request frame to a second wireless device and receive a probe response frame from the second wireless device in response to the probe request frame. In addition, the probe response frame may include a name of a peripheral function supported by the second wireless device or a bitmap indicating the peripheral function supported by the second wireless device.

In a fourth technical aspect of the present invention, provided herein is a first wireless device, including: a transceiver and a processor. In this case, if the transceiver receives a probe request frame from a second wireless device, the processor may control the transceiver to transmit a probe response frame to the second wireless device in response to the probe request frame. In addition, the probe response frame may be configured to include a name of a peripheral function supported by the first wireless device or the peripheral function supported by the first wireless device.

The above description and the following detailed description of the present invention are exemplary and are for additional explanation of the invention disclosed in the claims.

Advantageous Effects

According to the present invention, a WFDS docking service can be provided. Particularly, a wireless dockee can be provided with a peripheral function supported by a wireless docking center during a device discovery procedure. Thus, the wireless dockee can check the peripheral function supported by the wireless docking center without performing a service discovery procedure.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting unclear, structures and/or devices known to the public are skipped or can be represented as block diagrams centering on the core functions of the structures and/or devices. Wherever possible, the same reference numbers will be used throughout the drawings to refer to the same or like parts.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL and SC-FDMA in uplink (hereinafter abbreviated UL). And, LTE-A (LTE-Advanced) is an evolved version of 3GPP LTE.

For clarity, the following description mainly concerns IEEE 802.11 system, by which the technical features of the present invention may be non-limited.

Structure of WLAN System

Figure 1:
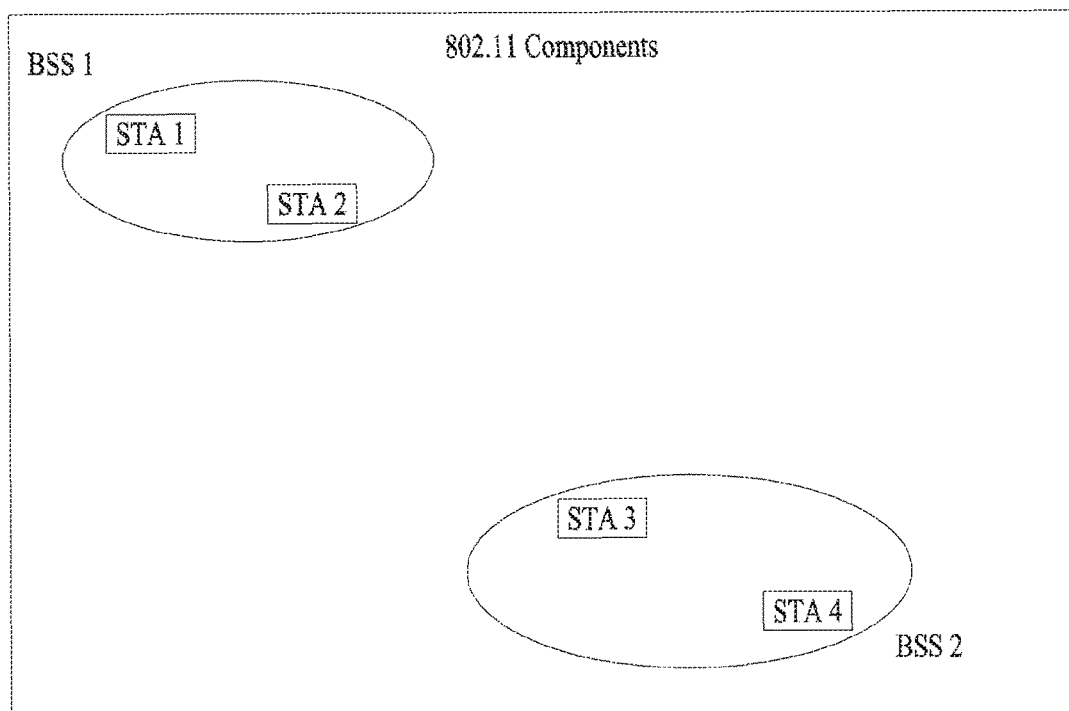
FIG. 1 illustrates a diagram for an example of a structure of IEEE 802.11 system to which the present invention is applicable.

FIG. 1 illustrates a diagram for an example of a structure of IEEE 802.11 system to which the present invention is applicable.

IEEE 802.11 structure may include a plurality of components and WLAN supportive of transparent STA mobility for an upper layer can be provided by interactions of the components. A basic service set (BSS) may correspond to a basic configuration block in IEEE 802.11 LAN. FIG. 1 shows one example that two basic service sets (BSS 1 and BSS 2) exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communications. This area may be named a basic service area (BSA). Once the STA moves away from the BSA, it is unable to directly communicate with other STAs within the corresponding BSA.

A BSS of a most basic type in IEEE 802.11 LAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. The above-configured LAN is not configured by being designed in advance but can be configured under the necessity of LAN. And, this may be called an ad-hoc network.

If an STA is turned on/off or enters/escapes from a BSS area, membership of the STA in a BSS can be dynamically changed. In order to obtain the membership in the BSS, The STA can join the BSS using a synchronization procedure. In order to access all services of the BSS based structure, the STA should be associated with the BSS. This association may be dynamically configured or may include a use of a DSS (distribution system service).

Layer Structure

The operation of the STA which is operated in the wireless LAN system may be described in view of layer structure. In aspect of device configuration, layer structure may be implemented by a processor. The STA may have a structure of a plurality of layers. For example, a layer structure handled by the 802.11 standard document mainly includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptionally include management entities called MAC sublayer management entity (MLME) and physical layer management entity (PLME), respectively. These entities provide a layer management service interface that operates a layer management function.

In order to provide exact MAC operation, an SME (Station Management Entity) is present within each STA. The SME is a layer independent entity that may be viewed as residing in a separate management plane or as residing "off to the side." The exact functions of the SME are not specified in this document, but in general this entity may be viewed as being responsible for such functions as the gathering of layer-dependent status from the various layer management entities (LMEs), and similarly setting the value of layer-specific parameters. The SME may perform such functions on behalf of general system management entities and may implement standard management protocols.

The aforementioned entities interact in various ways. For example, the entities may interact by exchanging GET/SET primitives. The primitive means a set of elements or parameters related to a specific object. XX-GET.request primitive is used for requesting the value of the given MIB attribute (management information base attribute). XX-GET.confirm primitive is used for returning the appropriate MIB attribute value if status is "success," otherwise returning an error indication in the Status field. XX-SET.request primitive is used for requesting that the indicated MIB attribute be set to the given value. If this MIB attribute implies a specific action, this requests that the action be performed. And, XX-SET.confirm primitive is used such that, if status is "success," this confirms that the indicated MIB attribute has been set to the requested value, otherwise it returns an error condition in the status field. If this MIB attribute implies a specific action, this confirms that the action has been performed.

Also, the MLME and the SME may exchange various MLME_GET/SET primitives through MLME_SAP (Service Access Point). Also, various PLME_GET/SET primitives may be exchanged between PLME and SME through PLME_SAP, and may be exchanged between the MLME and PLME through MLME-PLME_SAP.

Evolution of Wireless LAN

Standards for Wireless Local Area Network (WLAN) technology have been developed by Institute of Electrical and Electronics Engineers (IEEE) 802.11 group. IEEE 802.11a and 802.11b use an unlicensed band at 2.4 GHz or 5 GHz. IEEE 802.11b provides a transmission rate of 11 Mbps and IEEE 802.11a provides a transmission rate of 54 Mbps. IEEE 802.11g applies Orthogonal Frequency-Division Multiplexing (OFDM) at 2.4 GHz to provide a transmission rate of 54 Mbps. IEEE 802.11n may use Multiple Input Multiple Output (MIMO)-OFDM, and provide a transmission rate of 300 Mbps. IEEE 802.11n may support a channel bandwidth up to 40 MHz to provide a transmission rate of 600 Mbps.

A direct link setup (DLS) related protocol under the environment according to IEEE 802.11e is based on QBSS (Quality BSS (basic service set)) that BSS supports QoS (Quality of Service). In QBSS, AP as well as non-AP STA is a QAP (Quality AP) that supports QoS. However, under the WLAN environment (for example, WLAN environment according to IEEE 802.11a/b/g which is currently commercialized, although the non-AP STA is a QSTA (Quality STA) that supports QoS, the AP is likely to be a legacy AP that fails to support QoS. As a result, there is a limitation that DLS service cannot be used even in case of the QSTA under the WLAN environment which is currently commercialized.

Tunneled direct link setup (TDLS) is a wireless communication protocol which is newly suggested to solve such a limitation. TDLS, although not supporting QoS, enables QSTAs to set a direct link even under the WLAN environment such as IEEE 802.11a/b/g which is currently commercialized and set a direct link even in case of a power save mode (PSM). Accordingly, TDLS prescribes all the procedures for enabling QSTAs to set a direct link even at BSS managed by the legacy AP. Hereinafter, a wireless network that supports TDLS will be referred to as a TDLS wireless network.

Wi-Fi Direct Network

The WLAN according to the related art has mainly handled the operation of an infrastructure BSS that a radio access point (AP) functions as a hub. The AP performs a physical layer support function for wireless/wire connection, a routing function for devices on the network, and service provision for adding/removing a device to/from the network. In this case, devices within the network are not directly connected with each other but connected with each other through the AP.

As technology for supporting direct connection between devices, enactment of Wi-Fi Direct standard has been discussed.

Figure 2:
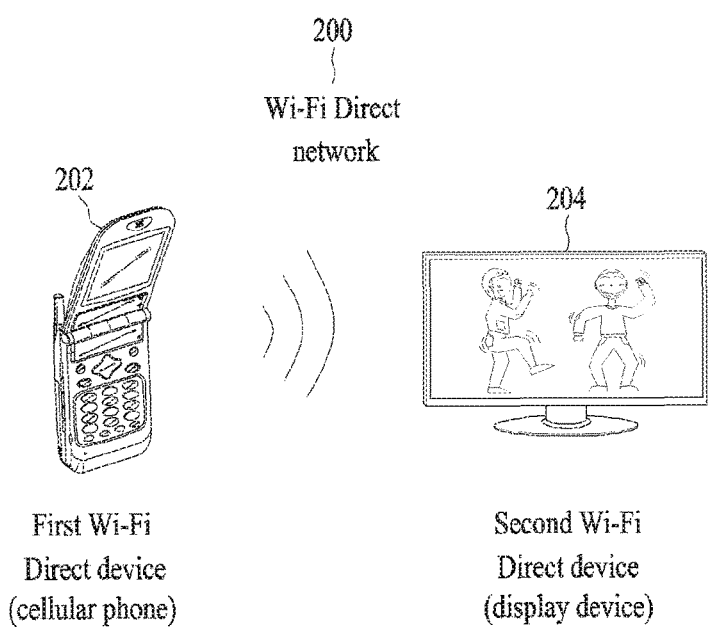
FIG. 2 illustrates a diagram showing an exemplary Wi-Fi Direct network.

FIG. 2 illustrates a diagram showing an exemplary Wi-Fi Direct network. The Wi-Fi Direct network is a network that enables Wi-Fi devices to perform device-to-device (D2D) (or peer-to-peer (P2P)) communication even without association with a home network, office network and hot spot network, and has been suggested by Wi-Fi Alliance. Hereinafter, Wi-Fi Direct based communication will be referred to as Wi-Fi Direct D2D communication (simply D2D communication) or Wi-Fi Direct P2P communication (simply, P2P communication). Also, a device that performs Wi-Fi Direct P2P will be referred to as Wi-Fi Direct P2P device, simply referred to as P2P device or Peer device.

Referring to FIG. 2, the Wi-Fi Direct network (200) may include at least one Wi-Fi device that includes a first P2P device (202) and a second P2P device (204). The P2P device may include Wi-Fi supporting devices, for example, a display device, a printer, a digital camera, a projector, a smart phone, etc. In addition, the P2P device may include a non-AP STA and an AP STA. In this example, the first P2P device (202) is a smart phone, and the second P2P device (204) is a display device. The P2P devices of the Wi-Fi Direct network may directly be interconnected. In more detail, P2P communication may mean that a signal transmission path between two P2P devices is directly configured in the corresponding P2P devices without passing through a third device (e.g., AP) or a legacy network (e.g., a network accessed to WLAN through an AP). In this case, a signal transmission path directly configured between two P2P devices may be limited to a data transmission path. For example, P2P communication may mean that a plurality of non-STAs transmit data (e.g., voice, image, text information, etc.) without passing through the AP. A signal transmission path for control information (e.g., resource allocation information for P2P configuration, wireless device identification information, etc.) may directly be configured between P2P devices (e.g., non-AP STA to non-AP STA, non-AP STA to AP), may be configured between two P2P devices (e.g., non-AP to non-AP STA) through the AP, or may be configured between the AP and the corresponding P2P device (e.g., AP to non-AP STA #1, AP to non-AP STA #2).

Figure 3:
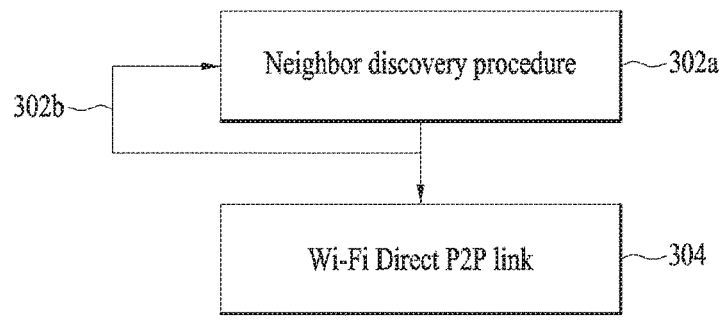
FIG. 3 illustrates a diagram showing a method for configuring a Wi-Fi Direct network.

FIG. 3 illustrates a diagram showing a method for configuring a Wi-Fi Direct network.

Referring to FIG. 3, the Wi-Fi Direct network setup procedure may be largely classified into two procedures. The first procedure is a neighbor discovery (ND) procedure (S302a), and the second procedure is a P2P link configuration and communication procedure (S304). Through the neighbor discovery procedure, the P2P device (e.g., 202 of FIG. 2) searches for another neighbor P2P device (e.g., 204 of FIG. 2) within (its own radio) coverage, and may obtain information required for association (e.g., pre-association) with the corresponding P2P device. In this case, the pre-association may mean a second layer pre-association in a radio protocol. For example, information required for the pre-association may include identification information of the neighbor P2P device. The neighbor discovery procedure may be carried out per available radio channel (S302b). Afterwards, the P2P device (202) may perform Wi-Fi Direct P2P link configuration/communication with another P2P device (204). For example, after the P2P device (202) is associated with a peripheral P2P device (204), the P2P device (202) may determine whether the corresponding P2P device (204) is a P2P device incapable of satisfying service requirements of a user. To this end, after the P2P device (202) is second layer pre-associated with the peripheral P2P device (204), the P2P device (202) may search for the corresponding P2P device (204). If the corresponding P2P device (204) does not satisfy service requirements of the user, the P2P device (202) may sever the second layer association configured for the corresponding P2P device (204), and may configure the second layer association with another P2P device. By contrast, if the corresponding P2P device (204) satisfies the service requirements of the user, the two P2P devices (202 and 204) may transmit and receive signals through a P2P link.

Figure 4:
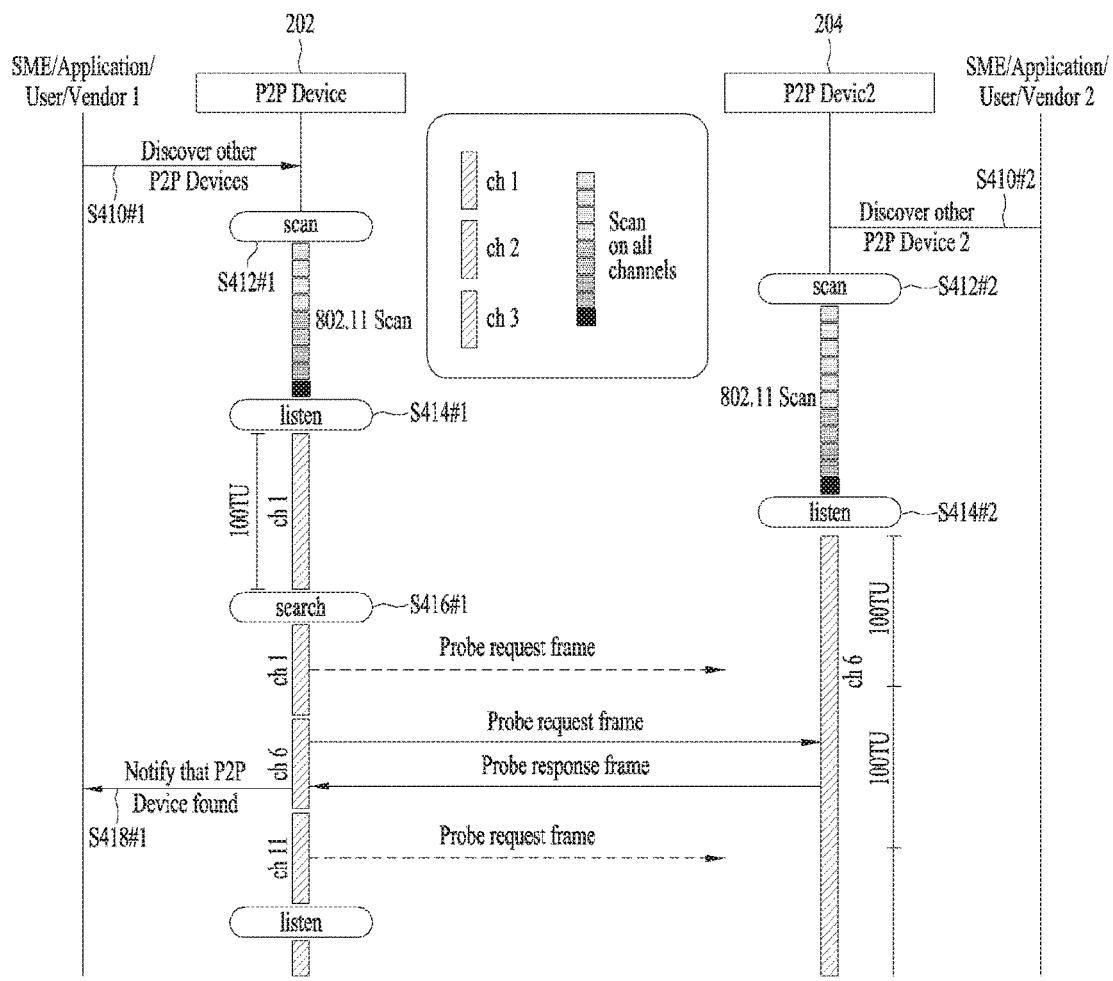
FIG. 4 illustrates a diagram showing a neighboring discovery procedure.

FIG. 4 illustrates a diagram showing a neighboring discovery procedure. The example of FIG. 4 may be understood as an operation between the P2P device (202) and the P2P device (204) shown in FIG. 3.

Referring to FIG. 4, the neighbor discovery procedure of FIG. 3 may be initiated by indication of station management entity (SME)/application/user/vendor (S410), and may be classified into a scanning step (S412) and finding steps (S414 to S416). The scanning step (S412) may include the operation for scanning all available RF channels according to 802.11 schemes. Through the above-mentioned operation, the P2P device may confirm the best operation channel. The finding steps (S414 to S416) may include a listening mode (S414) and a search mode (S416). The P2P device may alternately repeat the listening mode (S414) and the search mode (S416). The P2P devices (202 and 204) may perform active search by using a probe request frame in the search mode (S416). For rapid search, the search range may be limited to social channels denoted by Channels #1, #6, #11 (2412, 2437, 2462 MHz). In addition, the P2P devices (202 and 204) may select only one channel from three social channels in the listening mode (S414), and maintain a reception status. In this case, if the other P2P device (e.g., 202) receives the probe request frame transmitted in the search mode, the P2P device (e.g., 204) generates a probe response frame in response to the received probe request frame. A time of the listening mode (S414) may be given at random (e.g., 100, 200, 300 time unit (TU)). The P2P devices continuously repeat the search mode and the reception mode so that they may reach a common channel. After the P2P device discovers another P2P device, the P2P device may discover/exchange a device type, a manufacturer, or a familiar device name by using the probe request frame and the probe response frame such that the P2P device may selectively be coupled to the corresponding P2P device. If the P2P device discovers the peripheral P2P device and obtains necessary information through the neighbor discovery procedure, the P2P device (e.g., 202) may notify SME/application/user/vendor of the P2P device discovery (S418).

Presently, P2P may be mainly used for semi-static communication such as remote printing, photo sharing, etc. However, due to generalization of Wi-Fi devices and location based services, P2P availability is gradually increased. For example, it is expected that the P2P device will actively be used for social chatting (for example, wireless devices subscribed to Social Network Service (SNS) recognize radio devices located in a neighboring region on the basis of the location based service and transmit and receive information), location-based advertisement provision, location-based news broadcasting, and game interaction between wireless devices. For convenience of description, such P2P application will hereinafter be referred to as new P2P application.

Figure 5:
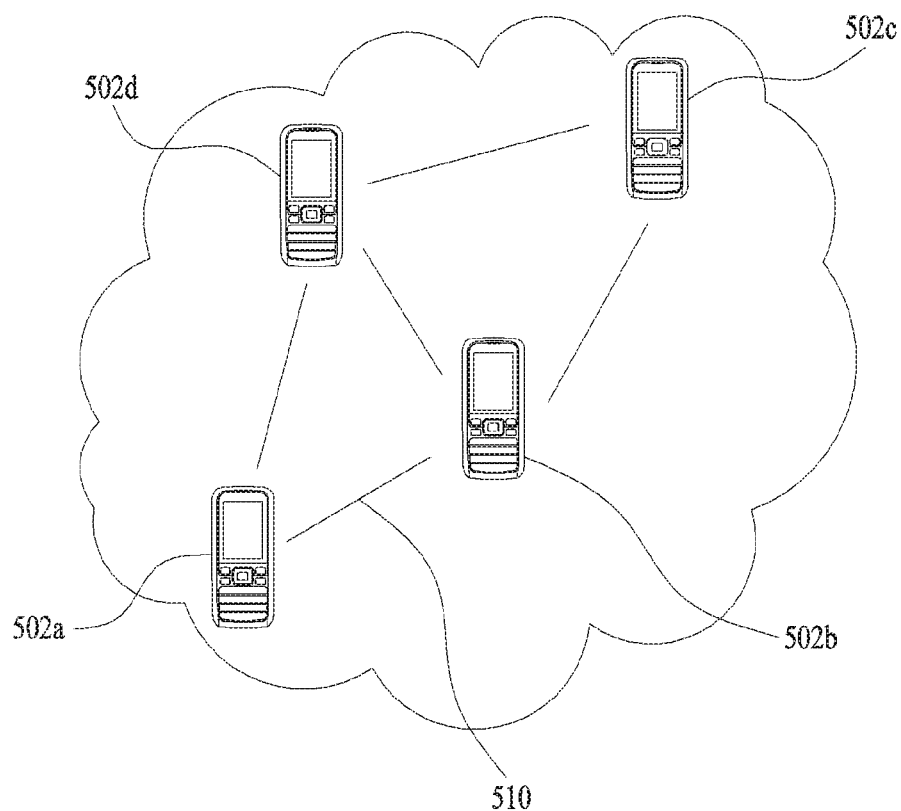
FIG. 5 illustrates a diagram showing a new aspect of a Wi-Fi Direct network.

FIG. 5 illustrates a diagram showing a new aspect of a Wi-Fi Direct network.

The example of FIG. 5 may be understood as Wi-Fi Direct network aspect for use in the case in which new P2P application (e.g., social chatting, location-based service provision, game interaction, etc.) is applied.

Referring to FIG. 5, a plurality of P2P devices (502a-502d) performs P2P communication (510) in the Wi-Fi Direct network, P2P device(s) constituting the Wi-Fi Direct network may be changed at any time due to movement of the P2P device(s), and a new Wi-Fi Direct network may be dynamically generated or deleted within a short time. As described above, characteristics of the new P2P application indicate that P2P communication may dynamically be performed and terminated within a short time among a plurality of P2P devices in the dense network environment.

Figure 6:
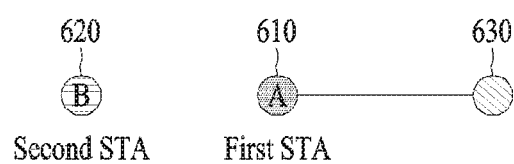
FIG. 6 illustrates a diagram showing a method for configuring a link for Wi-Fi Direct communication.
Figure 6:
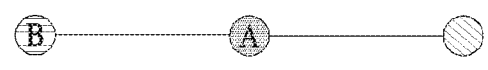

FIG. 6 illustrates a diagram showing a method for configuring a link for Wi-Fi Direct communication.

As shown in FIG. 6a, a first STA (610) (hereinafter, referred to as "A") is being operated as a group owner during conventional Wi-Fi Direct communication. If the A (610) discovers a second STA (620) (hereinafter, referred to as "B"), which is a new Wi-Fi Direct communication target and does not perform Wi-Fi Direct communication, during communication with a group client (630) of conventional Wi-Fi Direct communication, the A (610) tries link setup with the B (620). In this case, new Wi-Fi Direct communication is Wi-Fi Direct communication between the A (610) and the B (620), and since the A is a group owner, the A may perform communication setup separately from communication of the conventional group client (630). Since one Wi-Fi Direct group may include one group owner and one or more group clients, as shown in FIG. 6b, a Wi-Fi Direct link may be set as the A (610) which is one group owner is satisfied. In this case, the A (610) invites the B (620) to the conventional Wi-Fi Direct communication group, and in view of Wi-Fi Direct communication characteristic, WFD communication between the A (610) and the B (620) and between the A (610) and the conventional group client (630) may be performed. Wi-Fi Direct communication is supported selectively based on the device's capability.

Figure 7:
FIG. 7 illustrates a diagram showing a method for associating with a communication group that performs Wi-Fi Direct.
Figure 7:

FIG. 7 illustrates a diagram showing a method for associating with a communication group that performs Wi-Fi Direct.

As shown in FIG. 7*a*, a first STA (710) (hereinafter, referred to as "A") is performing communication as a group owner for a group client (730), and a second STA (720) (hereinafter, referred to as "B") is performing communication as a group owner for a group client (740). As shown in FIG. 7*b*, the A (710) may terminate conventional Wi-Fi Direct communication and may perform association with a Wi-Fi Direct communication group to which the B (720) belongs. Since the A (710) is a group owner, the A (710) becomes a group client. Preferably, the A (710) terminates the conventional Wi-Fi Direct communication before requesting association with the B (720).

Figure 8:
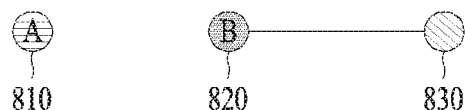
FIG. 8 illustrates a diagram showing a method for configuring a link for Wi-Fi Direct communication.
Figure 8:

FIG. 8 illustrates a diagram showing a method for configuring a link for Wi-Fi Direct communication.

As shown in FIG. 8*a*, a second STA (820) (hereinafter, referred to as "B") is being operated as a group owner during conventional Wi-Fi Direct communication. If the B (820) is performing conventional Wi-Fi Direct communication with a group client (830), a first STA (810) (hereinafter, referred to as "A"), which does not perform the Wi-Fi Direct communication, discovers the B (820) and tries link setup for new Wi-Fi Direct communication with the B (820). In this case, if the B (820) accepts link setup, a new Wi-Fi Direct communication link between the A (810) and the B (820) is set, and the A (810) is operated as a client of conventional Wi-Fi Direct group of the B (820). This case corresponds to the case where the A (810) performs association with the Wi-Fi Direct communication group of the B (820). The A (810) may only perform Wi-Fi Direct communication with the B (820) which is a group owner, and Wi-Fi Direct communication between the A (810). Wi-Fi Direct communication is supported selectively based on the device's capability.

Figure 9:
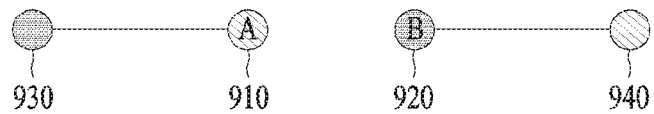
FIG. 9 illustrates a diagram showing a method for configuring a link that is associated with a Wi-Fi Direct communication group.
Figure 9:

FIG. 9 illustrates a diagram showing a method for configuring a link that is associated with a Wi-Fi Direct communication group.

As shown in FIG. 9*a*, a first STA (910) (hereinafter, referred to as "A") is performing Wi-Fi Direct communication as a group client for a group owner (930). At this time, the A (910) discovers a second STA (920) (hereinafter, referred to as "B"), which is performing communication as a group owner for a group client (940) of another Wi-Fi Direct communication, and terminates a link with the group owner (930). And, the A (910) may perform association with Wi-Fi Direct of the B (920).

Wi-Fi Direct Service (WFDS)

Wi-Fi Direct is the network connection standard technology defined to include an operation of a link layer. Since the standard of an application operated in an upper layer of a link configured by Wi-Fi Direct is not defined, it is difficult to support compatibility in the case that the application is driven after devices which support Wi-Fi Direct are interconnected. To solve this problem, standardization of the operation of the upper layer application called Wi-Fi Direct Service (WFDS) has been discussed by the Wi-Fi Alliance (WFA).

Figure 10:
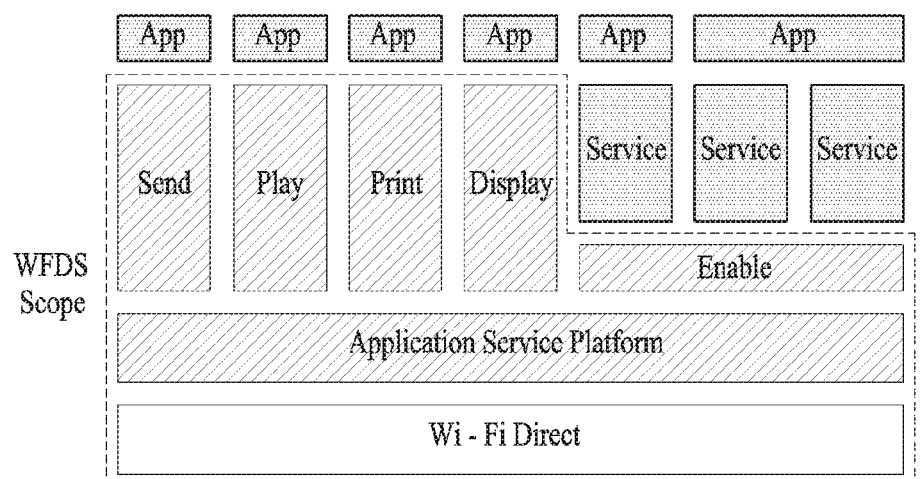
FIG. 10 is a diagram for explaining a WFDS framework configuration element.

FIG. 10 illustrates a diagram illustrating WFDS framework components.

A Wi-Fi Direct layer of FIG. 10 means a MAC layer defined by the Wi-Fi Direct standard. The Wi-Fi Direct layer may include software compatible with the Wi-Fi Direct standard. Wireless connection may be configured below the Wi-Fi Direct layer by a physical layer (not shown) compatible with WiFi PHY layer. A platform called an ASP (Application Service Platform) is defined above the Wi-Fi Direct layer.

The ASP is a logical entity that implements functions required for services. The ASP is a common shared platform, and may process tasks such as device discovery, service discovery, ASP session management, connection topology management and security between an application layer above the ASP and the Wi-Fi Direct layer below the ASP.

A service layer is defined above the ASP. The service layer includes use case specific services. The WFA defines four basis services, Send, Play, Display and Print services. The four basic services defined in the WFA will be described briefly. First of all, Send means service and application that may perform file transfer between two WFDS devices. The Send service may be referred to as a file transfer service (FTS) in that it is intended for file transfer between peer devices. Play means a service and application that shares or streams audio/video (A/V), photo, music, etc. based on DLNA (Digital Living Network Alliance) between two WFDS devices. Print means a service and application that enables documents and photos to be output between a device having contents such as documents, photos, and so on, and a printer. Display means a service and application that enables screen sharing between a Miracast source and a sink of WFA.

An enable API (Application Program Interface) shown in FIG. 10 is defined to use an ASP common platform in the case that a third party application in addition to basic service defined by the WFA is supported. The service defined for the third party application may be used by one application only, or may be used generally (or commonly) by various applications.

Hereinafter, for convenience of description, the service defined by the WFA will be referred to as a WFA service, and the service newly defined by the third party not the WFA will be referred to as an enable service.

The application layer may provide a user interface (UI), and serves to express information to be recognized by the user and transfer an input of the user to a lower layer.

Discovery Procedure in WFDS

Figure 11:
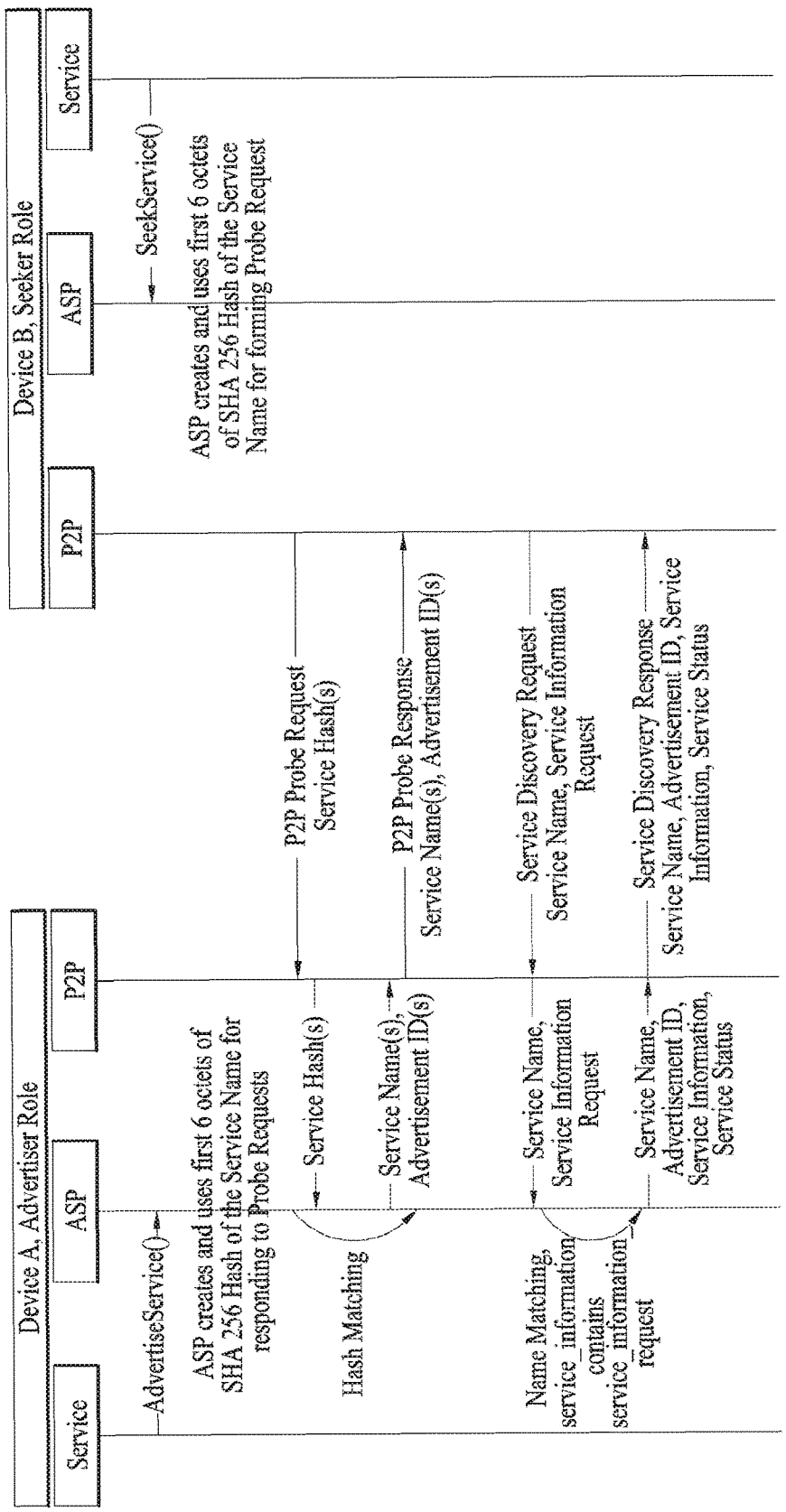
FIG. 11 is a diagram for explaining a device discovery procedure and a service discovery procedure in WFDS.

FIG. 11 is a diagram for explaining a device discovery procedure and a service discovery procedure in WFDS. An ASP session setup operation shown in FIG. 11 means that a specific service of a specific P2P device searches for another P2P device and service.

For convenience of description, in FIG. 11, it is assumed that device A is operated as a service advertiser for advertising its service and device B is operated as a service seeker for searching for a service.

If a service layer of the device A transmits Advertise Service Method to ASP, the ASP of the device A may advertise its service on the basis of information included in the Advertise Service Method and stand by to allow another device to discover the corresponding service.

If a service layer of the device B transmits Seek Service Method to ASP, the ASP of the device B may search for a device, which supports a higher application or a service desired by a user, on the basis of information included in the received Seek Service Method. For example, if the service layer of the device B receives information indicating intention to use a service (i.e., Use Service) from an application layer, the service layer may transfer the Seek Service Method, which includes information on the service that needs to be searched for, to the ASP.

Having received the Seek Service Method, the ASP of the device B may transmit a probe request frame to discover the device that supports the desired service. In this case, the probe request frame may include a hash value obtained by converting a service name of a service, which the device B desires to search for or may support, into a hash. The hash value is created by the ASP in a manner of converting the service name into a hash form and it may have a length of 6 octets. The probe request frame may be broadcasted or unicasted for a specific device.

Having received the probe request frame, the device A attempts hash matching. If determining that a service matched with the hash value included in the probe request frame is supported, the device A may transmit a probe response frame to the device B. In this case, the probe response frame may include at least one of a service name field and an advertisement ID field.

If receiving from the device A the probe response frame for indicating that the service, which the device B desires to search for, can be supported, the device B may transmit a service discovery request frame to discover service information of the device A. In this case, the service discovery request frame may include a service name field. The service name field includes a complete service name desired to be searched for or a prefix of a service name desired to be searched for.

After performing service name matching, the device A may transmit to the device B a service discovery response frame for informing whether the service, which the device B desires to search for, is available. The service discovery response frame may include service name, service status, advertisement ID and service information. Here, the service name may include a string that indicates a service name of an advertised service.

However, the service discovery procedure is not mandatory so it may not be performed after the device discovery.

Based on the above description, the present invention proposes a new docking service besides the predefined WFDS. Hereinafter, the docking service defined in the present invention will be described in detail.

Wi-Fi Direct Docking

A Wi-Fi Direct docking service means a service that enables a first device to use peripheral functions provided by a second device after access to the second device. Here, the second device providing the peripheral functions to the first device may be referred to as a wireless docking center (WDC) (or Wi-Fi docking center) and the first device accessing to the WDC may be referred to as a wireless dockee (WD) (or Wi-Fi dockee).

The peripheral function is not part of the WD but it corresponds to a logical I/O (input/output) function, which can be used by the WD through access to the WDC. Moreover, a protocol that enables to use (or access) the peripheral functions through a Wi-Fi network may be referred to as a peripheral function protocol (PFP). For example, the PFP may include WSB (Wi-Fi serial bus) for utilizing I/O devices (e.g., camera, USB, etc.), which use a serial interface of the WDC, a Wi-Fi display or WiGig (wireless gigabits) display extension for using a display device of the WDC, etc. Furthermore, a group of one or more peripheral functions, which can be docked by the WD, may be referred to as a wireless docking environment (WDN).

Figure 12:
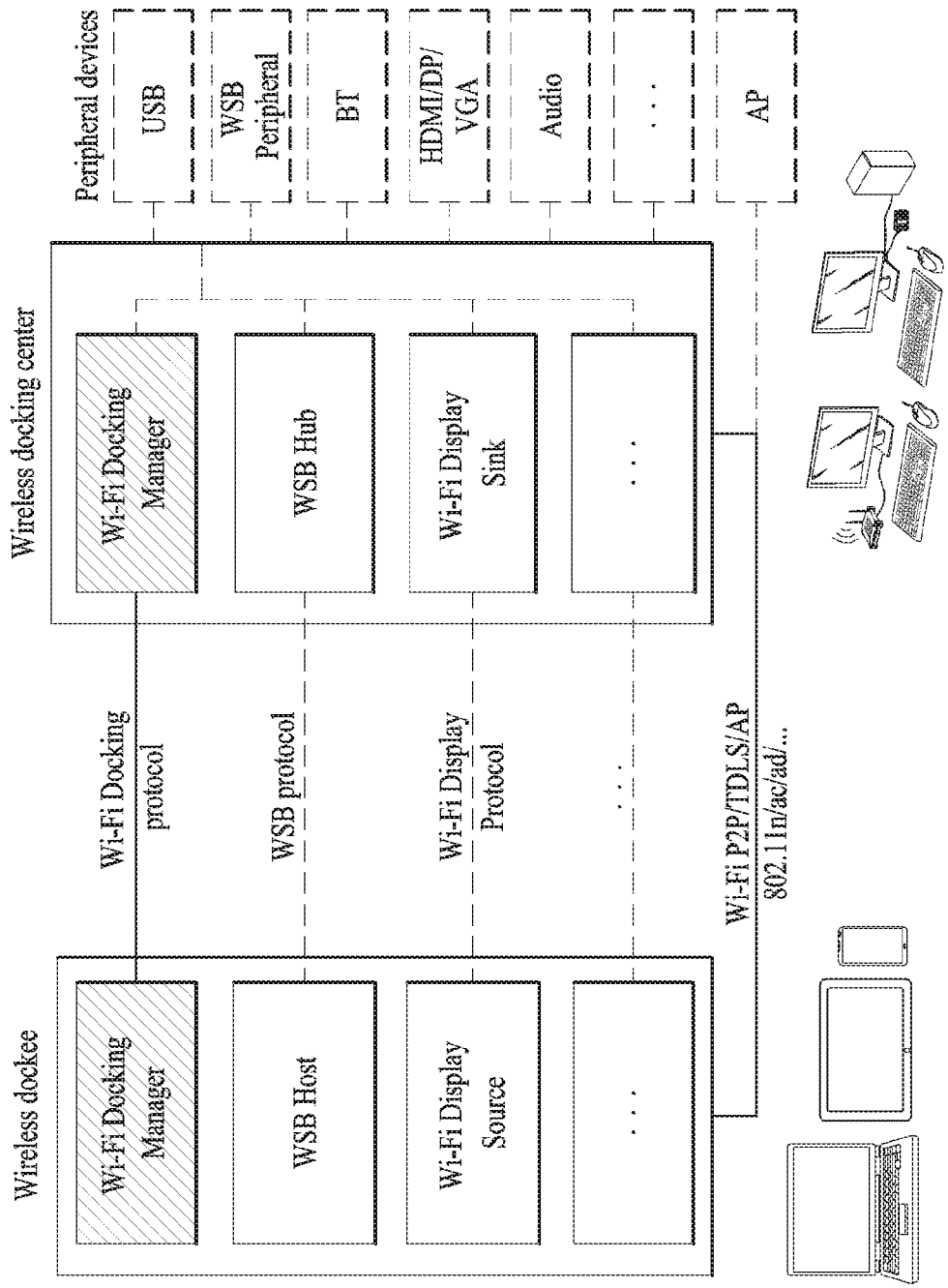
FIG. 12 is a diagram illustrating a docking service in a simple way.

FIG. 12 is a diagram illustrating a docking service in a simple way. When a docking service is initiated between a WD and a WDC, the WD may use peripheral functions provided by the WDC. For instance, if the WDC is a laptop, the WD may perform mirroring of the WDC or perform remote control of the WDC. Additionally, if the WDC is connected to another electronic device through USB, the WD may use the electronic device connected to the WDC. For example, if a printer is connected to the WDC through USB, the WD may be provided with an additional function such as printing by accessing the printer connected to the WDC.

Further, the WD may utilize a device paired with the WDC through Bluetooth (BT), a Bluetooth device connected through HDMI/DP/VGA, an audio device connected to the WDC, etc.

That is, the WD may mean a user device (e.g., smartphone, PDA, laptop) capable of using convenience functions provided by the WDC and the WDC may mean a device for connecting the peripheral functions to the WD and controlling the functions in order for the WD to have more user experience.

The WDC can be classified into a dedicated docking product to be used for a single purpose without association with peripheral devices and a multi-purpose peripheral connectivity hub for providing peripheral functions through association with peripheral devices. For example, the dedicated docking device may mean a device for a simple single-purpose without association with peripheral devices such as a printer dock for providing a print service, an audio dock for providing an audio output function, or a video dock (e.g., DVD player) for providing video and audio input/output. On the contrary, the multi-purpose peripheral connectivity hub may mean a device with expandability such as a laptop that can connected to a printer, an audio output device, a display device, etc.

To initiate the docking service, the WD needs to perform a procedure for discovering the WDC. Hereinafter, a description will be given of a discovery procedure for a wireless docking service according to the present invention.

Discovery Procedure for Docking Service

To discover a WDC, a WD may perform transmission of a (P2P) probe request frame. In this case, the probe request frame may include a P2P information element (IE) containing a service hash of a service, which the WD desires to search for.

For instance, P2P information elements which may be included in a probe request frame and a probe response frame are listed in Table 1 below.

TABLE 1

| Attribute ID | Value |
| --- | --- |
| 21 | Service Hash |
| 22 | Session Information Data Info |
| 23 | Connection Capability Info |
| 24 | Advertisement ID Info |
| 25 | Advertised Service Info |
| 26 | Session ID Info |
| 27 | Feature Capability |
| 28 | Persistent Group Info |

Service hashes related to the attribute IDs listed in Table 1 can be defined as shown in Table 2.

TABLE 2

| Field | Size (octets) | Value | Description |
| --- | --- | --- | --- |
| Attribute ID | 1 | 21 | This identifies the type of P2P attribute (refer to Table 1 for details). |
| Length | 2 | 6XN | This is a length of the following field in the attribute. N represents the number of service hashes. |
| Service hash(es) | 6XN | Variable | This includes N service hash values. Each service hash corresponds to 6-octets array of a hash-converted value of a UTF-8 service name. |

As described in Table 2, a plurality of service hash values can be included in the service hash attribute. Accordingly, the length of the service hash attribute may vary depending on the service hash value.

A service hash value may be determined from upper 6 bytes of a value obtained by converting a service name desired to be searched for into a hash through SHA256 algorithm. For example, a name of the docking service can be defined as "org.wi-fi.docking". In this case, a string for identifying a type of the device desired to be searched for (e.g., wireless dockee or wireless docking center) may be additionally inserted into a lower layer of the service name.

For instance, a service name for discovering the WD may be defined as "org.wi-fi.docking.wd" by additionally inserting a string of "wd" and a service name for discovering the WDC may be defined as "org.wi-fi.docking.wdc" by additionally inserting a string of "wdc".

A string for identifying whether the WDC supports a peripheral function or whether the WDC supports a peripheral function protocol may be additionally inserted into a lower layer of the identification characters for identifying the WDC.

For instance, "org.wi-fi.docking.wdc.pf" may be used as a service name for discovering the WDC that supports the peripheral function and "org.wi-fi.docking.wdc.pfp" may be used as a service name for discovering the WDC that supports the peripheral function protocol.

Further, a string for identifying a service provided using the peripheral function protocol may be further inserted into a lower layer of the identification characters for identifying the peripheral function protocol. For example, a name of a display service that uses the peripheral function protocol may be defined as "org.wi-fi.docking.wdc.pfp.display", a name of a Wi-Fi serial bus service that uses the peripheral function protocol may be defined as "org.wi-fi.docking.wdc.pfp.wsb", and a name of a WiGig display extension service that uses the peripheral function protocol may be defined as "org.wi-fi.docking.wdc.pfp.wde".

A string for identifying the Wi-Fi serial bus service may be additionally inserted into a lower layer of the service name for identifying the docking service. For instance, a service name for discovering the Wi-Fi serial bus service may be defined as "org.wi-fi.docking.wsb.hub".

The peripheral function protocol related to the Wi-Fi serial bus may be defined as i) camera and USB video class input in WSB, ii) USB audio class 2.0 input in WSB, iii) USB HID class in WSB, iv) WSB hub functionality, v) USB communication device class using a network control model in WSB, vi) Bluetooth USB HCI transport in WSB, vii) USB HID class in WSB, or viii) USB large-capacity storage device.

A string for searching for the dedicated docking device may be additionally inserted into the service name for identifying the docking service. For instance, a service name for discovering the dedicated docking device may be defined as "org.wi-fi.docking.wfd" by additionally inserting characters of "wfd".

In this case, a string for searching for a service supported by the dedicated docking device may be additionally inserted into a lower layer of the string for identifying the dedicated docking device. For instance, "org.wi-fi.docking.wfd.sink.videoaudio" may be to discover a dedicated docking device for supporting video and audio input/output and "org.wi-fi.docking.wfd.sink.onlyvideo" may be to discover a dedicated docking device for supporting only video input/output.

When a wild card search (or prefix search) is used, it may include all services included in a prefix of a service name. For instance, if the service name includes a special character (e.g., '*'), all services included in a string except the special character, i.e., all services included in the prefix, may be searched for.

For instance, "org.wi-fi.docking.wdc.pfp*" may be used for discovering all services (e.g., "org.wi-fi.docking.wdc.pfp", "org.wi-fi.docking.wdc.pfp.display", "org.wi-fi.docking.wdc.pfp.wsb", etc.) included in the prefix, "org.wi-fi.docking.wdc.pfp". In this case, the WD may create a service hash value by converting "org.wi-fi.docking.wdc.pfp*" into a hash.

Having received the probe request frame from the WD, the WDC performs hash matching. If detecting a matched item on the basis of a hash matching result, the WDC may transmit the probe response frame in response to the probe request frame.

The probe response frame may include an advertised service info (information) attribute. The advertised service information may be defined as shown in Table 3.

TABLE 3

| Field | Size (octets) | Value | Description |
| --- | --- | --- | --- |
| Attribute ID | 1 | 25 | This identifies the type of P2P attribute (refer to Table 1 for details). |
| Length | 2 | Variable | This is a length of the following field in the attribute. |
| Advertised service descriptor(s) | Sum of all the advertised service descriptor(s) | | This is a list of advertised service descriptor(s). |

As shown in the example of Table 3, a plurality of advertised service descriptors can be included in the advertised service information attribute.

The format of the advertised service descriptor may be defined as shown in Table 4.

TABLE 4

| Field | Size (octets) | Value | Description |
| --- | --- | --- | --- |
| Advertisement ID | 4 | 0x00000000-0xFFFFFFFF | Advertisement ID of a local service |
| Service config (configuration) methods | 2 | Configuration method defined in WPS (Wi-Fi Protected Setup) specification | WSC method supported for the corresponding service |

TABLE 4-continued

| Field | Size (octets) | Value | Description |
|---|---|---|---|
| Service name length | 1 | 0x00-0xFF | Length of the service name |
| Service name | Variable | Variable | UTF-8 string for defining the service |

As described with reference to Table 4, the advertised service descriptor field may include the advertisement ID for identifying the service advertised by the WDC and the name of the service supported by the WDC.

When the string indicating the WDC is included in a service name, it is possible to check the name of the service supported by the WDC may be checked. However, peripheral functions supported by the WDC cannot be checked through the string. Thus, the WD needs to perform an additional service discovery procedure in order to check the peripheral functions supported by the WDC.

The present invention proposes a method for a wireless dockee to check peripheral functions provided by a wireless docking center during a device discovery procedure without performing a service discovery procedure. With reference to the following embodiments, the method will be described in detail.

When the WDC configures the probe response frame after receiving the probe request frame from the WD, the WDC may include at least one of the following information: i) names of peripheral functions of the WDC; ii) names of peripheral function protocols of the WDC; iii) names of peripheral functions in a default wireless docking environment; iv) a name of a specific wireless docking environment of the WDC; v) names of peripheral devices connected to the WDC; and vi) a device type (or name) of the WDC in a service name field of the advertised service descriptor. Particularly, the WDC may configure the probe response frame such that the advertised service descriptor includes a bitmap or a UTF-8 string, which contains the above-mentioned information.

Figures 13, 14:
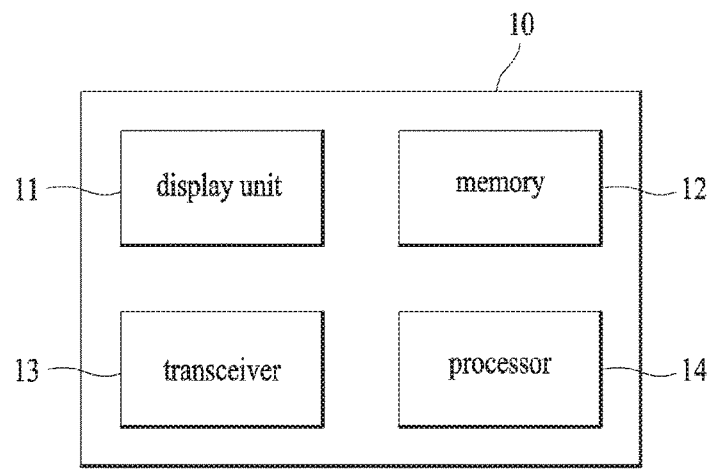
FIG. 13 is a schematic diagram showing a service field of an advertised service descriptor.
FIG. 14 is a block diagram for a configuration of a wireless device according one embodiment of the present invention.

FIG. 13 is a schematic diagram showing a service field of an advertised service descriptor. Referring to FIG. 13, a service name may be included in a service name field using a UTF-8 string and information on names of peripheral functions supported by a WDC may be included in the rest of the service name field. Although FIG. 13 illustrates that the information on the names of the peripheral functions supported by the WDC is represented in the form of a bitmap, the names of the peripheral functions supported by the WDC may be represented using the UTF-8 string unlike the example in the drawing.

Each bit of the bitmap may indicate a mapped peripheral function. For instance, if the value of a bit is set to '1', it may mean that a peripheral function corresponding to the bit is supported. Since bit values of a third peripheral function (i.e., PF3) and a fourth peripheral function (i.e., PF4) are set to '1' in the example illustrated in FIG. 13, it is considered that the WDC supports the third and fourth peripheral functions.

Meanwhile, after receiving a probe response frame, a WD may check names of peripheral functions supported by a first docking center.

Instead of adding the bitmap to the service name field, the WDC may add the bitmap for the peripheral functions to a new field of the advertised service descriptor.

For instance, a new format of the advertised service descriptor can be defined as shown in Table 5.

TABLE 5

| Field | Size (octets) | Value | Description |
|---|---|---|---|
| Advertisement ID | 4 | 0x00000000-0xFFFFFFFF | Advertisement ID of a local service |
| Service config (configuration) methods | 2 | Configuration method defined in WPS (Wi-Fi Protected Setup) specification | WSC method supported for the corresponding service |
| Service name length | 1 | 0x00-0xFF | Length of the service name |
| Service name | Variable | Variable | UTF-8 string for defining the service |
| Name (names of PF, PFP, WDN, a peripheral device, etc.) | Variable | Variable | Bitmap (or UTF-8 string) |

As described in Table 5, the additional name field can be included in the advertised service descriptor. The name field may include a bitmap which indicates at least one of a peripheral function name, a peripheral function protocol name, a wireless docking environment name, and a peripheral device name or availability of a combination thereof. For example, when the WDC can support a printer, a bit value corresponding to the printer may be set to '1' in the name field.

As another example, instead of the bitmap, the WDC may include a UTF-8 string indicating at least one of the peripheral function name, the peripheral function protocol name, the wireless docking environment name, and the peripheral device name in the name field. For example, when the WDC can support a printer, UTF-string "printer" for informing that the printer can be supported may be inserted into the name field.

In Table 5, it is shown the name field containing information on at least one of the peripheral function name, the peripheral function protocol name, the wireless docking environment name, and the peripheral device name is include in the advertised service descriptor. As another example, the WDC may configure different fields for the individual peripheral function name, peripheral function protocol name, wireless docking environment name, and peripheral device.

For instance, a new format of the advertised service descriptor may be defined as shown in Table 6.

TABLE 6

| Field | Size (octets) | Value | Description |
|---|---|---|---|
| Advertisement ID | 4 | 0x00000000-0xFFFFFFFF | Advertisement ID of a local service |
| Service config (configuration) methods | 2 | Configuration method defined in WPS (Wi-Fi Protected Setup) specification | WSC method supported for the corresponding service |
| Service name length | 1 | 0x00-0xFF | Length of the service name |
| Service name | Variable | Variable | UTF-8 string for defining the service |
| Peripheral function name | Variable | Variable | Bitmap (or UTF-8 string) |
| Peripheral function protocol name | Variable | Variable | Bitmap (or UTF-8 string) |

As described with reference to the example in Table 6, the advertised service descriptor may additionally include a peripheral function name field and a peripheral function protocol name field. The peripheral function name field may include a bitmap indicating the peripheral functions supported by the WDC or a UTF-8 string indicating the peripheral functions supported by the WDC. The peripheral function protocol name field may include a bitmap indicating the peripheral function protocols supported by the WDC or a UTF-8 string indicating the peripheral function protocols supported by the WDC.

Although not shown in Table 6, the advertised service descriptor may include a wireless docking environment name field indicating a wireless docking environment available in the WDC, a peripheral device name field indicating a peripheral device connected to the WDC, and the like.

Different from the above example, the WDC may configure the probe response frame such that the advertised service descriptor includes a capability field that represents capabilities for at least one of the peripheral function and the peripheral function protocol of the WDC as a bitmap.

For instance, a new format of the advertised service descriptor may be defined as shown in Table 7.

TABLE 7

| Field | Size (octets) | Value | Description |
| --- | --- | --- | --- |
| Advertisement ID | 4 | 0x00000000-0xFFFFFFFF | Advertisement ID of a local service |
| Service config (configuration) methods | 2 | Configuration method defined in WPS (Wi-Fi Protected Setup) specification | WSC method supported for the corresponding service |
| Service name length | 1 | 0x00-0xFF | Length of the service name |
| Service name | Variable | Variable | UTF-8 string for defining the service |
| WDC PF capability | 2 | Variable | Capability bitmap for peripheral functions connected to the WDC |
| WDC PFP capability | 1 or 2 | Variable | Peripheral function protocol capability |

As described with reference to the example in Table 7, the advertised service descriptor may include a WDC peripheral function capability field that represents the peripheral function supported by the WDC in the form of a bitmap and a WDC peripheral function protocol capability field that represent the peripheral function protocol supported by the WDC in the form of a bitmap.

The descriptor may further include a peripheral function bitmap field and a peripheral function protocol bitmap field. The peripheral function bitmap field may include a bitmap indicating the peripheral functions available in the WDC and the peripheral function protocol bitmap field may include a bitmap indicating the peripheral function protocols available in the WDC.

Each bit of the peripheral function bitmap field may indicate WDC's supporting capability for a prescribed peripheral function. For instance, if the value of a bit is set to '1', it may mean that the WDC can support a peripheral function corresponding to the bit. On the contrary, if the value of a bit is set to '0', it may mean that the WDC cannot support a peripheral function corresponding to the bit. The peripheral functions indicated by individual bits of the peripheral function bitmap field can be defined as shown in Table 8.

TABLE 8

| Bit | Description |
| --- | --- |
| B0 | Monitor |
| B1 | Keyboard |
| B2 | Mouse |
| B3 | Touch screen |
| B4 | Game pad |
| B5 | Camera |
| B6 | Gesture |
| B7 | Remote controller |
| B8 | Speaker |
| B9 | Microphone |
| B10 | Storage device |
| B11 | Printer |
| B12 | Scanner |
| B13 | Wireless charger (NFC) |
| B14 | Remote controller |
| B15 | Vendor-specific device |

If the WDC can support a monitor, keyboard, mouse and camera, bit values of B0, B1, B2, B5 in the peripheral function bitmap field may be set to '1'.

Each bit of the peripheral function protocol bitmap field may indicate WDC's supporting capability for a prescribed peripheral function protocol. For instance, if the value of a bit is set to '1', it may mean that the WDC can support a peripheral function corresponding to the bit. On the contrary, if the value of a bit is set to '0', it may mean that the WDC cannot support a peripheral function corresponding to the bit. The peripheral function protocols indicated by individual bits of the peripheral function protocol bitmap field can be defined as shown in Table 9.

TABLE 9

| Bit | Description |
| --- | --- |
| B0 | Wi-Fi display sink |
| B1 | WFDS display service receiver |
| B2 | Wi-Fi serial bus (WSB) |
| B3 | WiGig display extension (WDE) |
| B4-6 | Reserved |
| B7 | Vendor specific |

In case of a Wi-Fi display service (i.e., miracast), if the WDC operates as a sink device and a receiver device (i.e., source device) at the same time, bit values of B0 and B1 in the peripheral function protocol bitmap field may be set to '1'.

Table 10 shows another example of peripheral function protocols indicated by individual bits of the peripheral function protocol bitmap field.

TABLE 10

| Bit | Capability | Description |
| --- | --- | --- |
| B0 | Built-in display and speaker or dedicated AV connector | Wi-Fi display Sink with video and audio rendering, WDE Sink with video and audio rendering or USB AV class output over WSB |
| B1 | Built-in display or dedicated video connector | Wi-Fi Display Sink with video-only rendering, USB AV class output over WSB or WDE Sink with video-only rendering |
| B2 | Built-in audio output or dedicated audio output connector | Wi-Fi Display Sink with audio-only rendering, USB AV class output over WSB, USB audio class version 2.0.output over WSB or WDE Sink with audio-only rendering |
| B3 | Video input | USB Video class input and camera over WSB, USB AV class input over WSB or Wi-Fi Display Source |

TABLE 10-continued

| Bit | Capability | Description |
| --- | --- | --- |
| B4 | Built-in audio input or dedicated audio input connector | USB audio class version 2.0.input over WSB, USB AV class input over WSB or Wi-Fi Display Source with audio-only stream [O] |
| B5 | Built-in or legacy HID peripheral functions | USB HID class over WSB or Wi-Fi Display UIBC |
| B6 | USB ports | WSB Hub or Standalone WSB Client PAL for any of its ports |
| B7 | Ethernet | USB Communications Device class with NCM over WSB |
| B8 | Bluetooth | Bluetooth USB HCI transport over WSB |
| B9 | Accessory control | USB HID class over WSB |
| B10 | Generic storage | USB Mass Storage Device over WSB or USB MTP class over WSB |
| B11 | PCIe | WiGig Bus Extension |
| B12-B14 | Reserved | |
| B15 | Vendor specific | |

The definitions of the peripheral function capability field and peripheral function protocol capability field described with reference to Tables 7 to 10 are merely examples for explanation and the present invention is not limited thereto. In other words, the peripheral function capability field and peripheral function protocol capability field may be defined according to a mapping relation different from that described with reference to Tables 7 to 10.

When the probe response frame includes information on the above-mentioned peripheral functions and the like, the WD may check the peripheral functions supported by the WDC without performing the service discovery procedure. In other words, when the information on the peripheral functions and the like is included in the probe response frame, the WD may omit the service discovery procedure. On the contrary, if the information is not included in the probe response frame, the WD needs to perform the service discovery procedure to check the peripheral functions supported by the WDC.

FIG. 14 is a block diagram for a configuration of a wireless device according one embodiment of the present invention.

A wireless device 10 can include a display unit 11, a memory 12, a transceiver 13 and a processor 14. The transceiver 13 can transmit and receive a radio signal. For example, the transceiver can implement a physical layer according to IEEE 802 system.

The display unit 11 plays role in outputting information. A controller device can output a user interface for remotely controlling a controlling device through the display unit 11.

The processor 15 is electrically connected with the transceiver 13 and may be able to implement a physical layer and/or a MAC layer according to IEEE 802 system. And, the processor 11 can be configured to perform operations of encoding and decoding data for a control service.

A module for implementing an operation of a wireless device according to the aforementioned various embodiments of the present invention is stored in the memory 12 and can be executed by the processor 15. The memory 12 can be connected with the processor 11 by a means well-known to public in a manner of being included in the inside of the processor 15 or being installed at the outside of the processor 15.

A concrete configuration of the wireless device 10 shown in FIG. 14 can be implemented in a manner of independently applying the items mentioned earlier in the various embodiments of the present invention or applying two or more embodiments at the same time. For clarity, explanation on overlapped contents is omitted.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned various embodiments of the present invention are explained centering on a Wi-Fi Direct system, the embodiments can also be applied to various mobile communication systems in a same way.

What is claimed is:

1. A method of discovering a peripheral function provided by a wireless docking center, which is discovered by a wireless dockee, the method comprising:
    transmitting, by the wireless dockee, a probe request frame comprising a first hash value to the wireless docking center; and
    when the first hash value is equal to a second hash value obtained by converting a service name "org.wi-fi.docking.wdc", receiving, by the wireless dockee, a probe response frame from the wireless docking center in response to the probe request frame, the probe response frame comprising the service name "org.wi-fi.docking..wdc" and bitmap information indicating one or more peripheral functions which the wireless docking center is capable of providing,
    wherein the one or more peripheral functions correspond to one or more docking services provided by one or more devices connected with the wireless docking center.

2. The method of claim 1, wherein each bit of the bitmap information corresponds to a respective peripheral function among a plurality of peripheral functions, and wherein the plurality of peripheral functions comprises monitor, keyboard, mouse, touch screen, game pad, camera, speaker, printer, scanner and remote controller.

3. A method of providing a peripheral function supported by a wireless docking center to a wireless dockee, which is provided by the wireless docking center, the method comprising:

receiving, by the wireless docking center, a probe request frame comprising a first hash value from the wireless dockee; and when the first hash value is equal to a second hash value obtained by converting a service name "org.wi-fi.docking.wdc", transmitting, by the wireless docking center, a probe response frame to the wireless dockee in response to the probe request frame, the probe response frame comprising the service name "org.wi-fi.docking.wdc" and bitmap information indicating one or more peripheral functions which the wireless docking center is capable of providing, wherein the one or more peripheral functions correspond to one or more docking services provided by one or more devices connected with the wireless docking center.

4. The method of claim 3, wherein each bit of the bitmap information corresponds to a respective peripheral function among a plurality of peripheral functions, and wherein the plurality of peripheral functions comprises monitor, keyboard, mouse, touch screen, game pad, camera, speaker, printer, scanner and remote controller.

5. A Wireless Dockee, comprising:

a transceiver; and a processor, wherein the processor is configured to:

control the transceiver to transmit a probe request frame comprising a first hash value to a wireless docking center; and when the first hash value is equal to a second hash value obtained by converting a service name "org.wi-fi.docking.wdc", control the transceiver to receive a probe response frame from the wireless docking center in response to the probe request frame, the probe response frame comprising the service name "org.wi-fi.docking.wdc" and bitmap information indicating one or more peripheral functions which the wireless docking center is capable of providing, and wherein the one or more peripheral functions correspond to one or more docking services provided by one or more devices connected with the wireless docking center.

6. The Wireless Dockee of claim 5, wherein each bit of the bitmap information corresponds to a respective peripheral function among a plurality of peripheral functions, and wherein the plurality of peripheral functions comprises monitor, keyboard, mouse, touch screen, game pad, camera, speaker, printer, scanner and remote controller.

7. A wireless docking center, comprising:

a transceiver; and a processor, wherein the processor is configured to:

control the transceiver to receive a probe request frame comprising a first hash value from a wireless dockee; and when the first hash value is equal to a second hash value obtained by converting a service name "org.wi-fi.docking.wdc", control the transceiver to transmit a probe response frame to the wireless dockee in response to the probe request frame, the probe response frame comprising the service name "org.wi-fi.docking.wdc" and bitmap information indicating one or more peripheral functions which the wireless docking center is capable of providing, and wherein the one or more peripheral functions correspond to one or more docking services provided by one or more devices connected with the wireless docking center.

8. The wireless docking center of claim 7, wherein each bit of the bitmap information corresponds to a respective peripheral function among a plurality of peripheral functions, and wherein the plurality of peripheral functions comprises monitor, keyboard, mouse, touch screen, game pad, camera, speaker, printer, scanner and remote controller.

\* \* \* \* \*